July 11, 1939.  J. W. FRENCH  2,166,046
STEREOSCOPIC OBSERVATION INSTRUMENT, SUCH AS STEREOSCOPIC RANGEFINDERS
Filed July 3, 1937  3 Sheets-Sheet 1
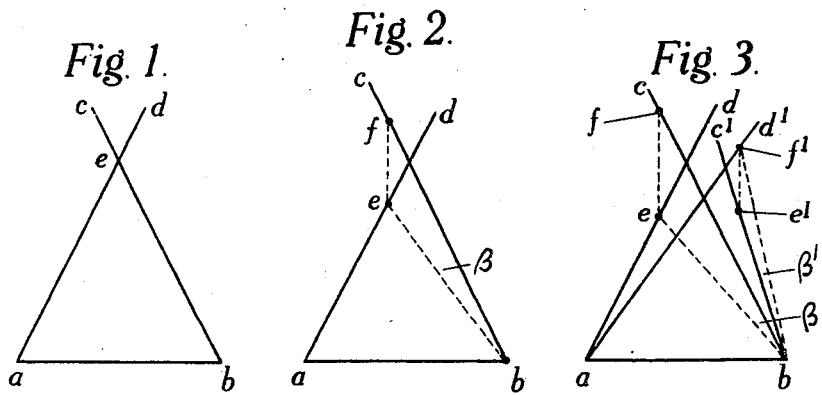
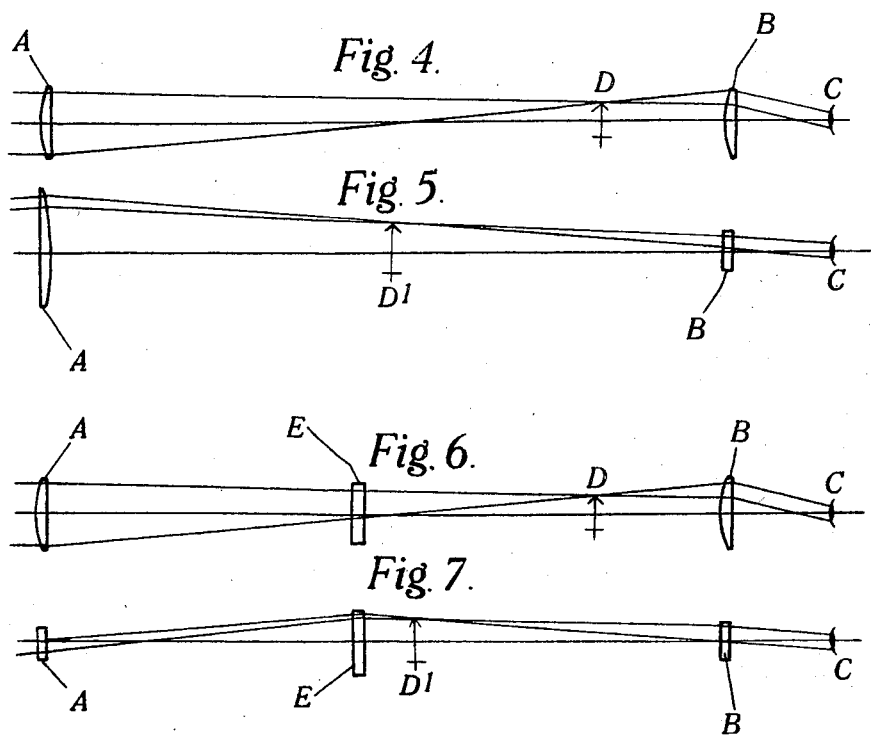
Inventor
James Weir French
By E. H. Bond
Attorney.

July 11, 1939.  J. W. FRENCH  2,166,046
STEREOSCOPIC OBSERVATION INSTRUMENT, SUCH AS STEREOSCOPIC RANGEFINDERS
Filed July 3, 1937    3 Sheets-Sheet 3
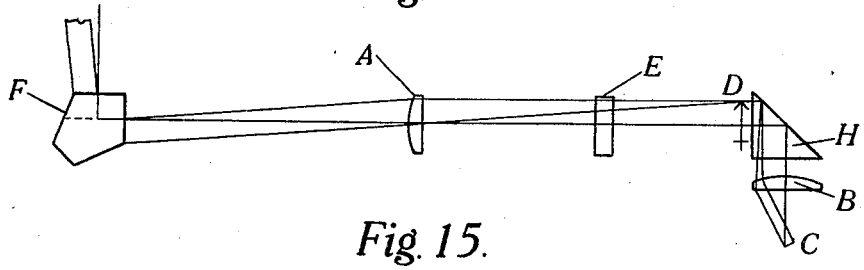
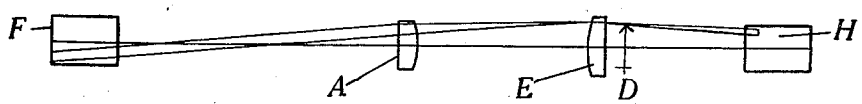
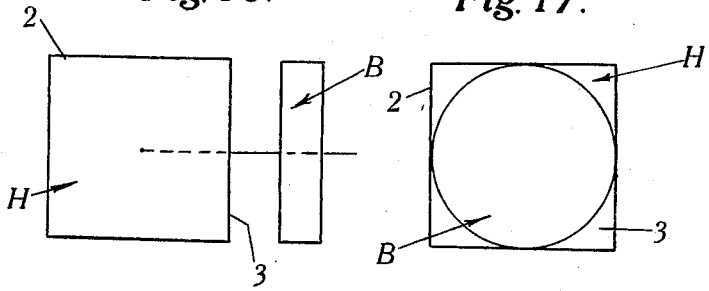
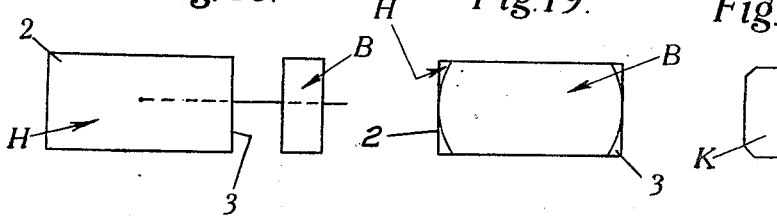
Inventor
James Weir French
By E. H. Bond
Attorney Patented July 11, 1939

2,166,046

UNITED STATES PATENT OFFICE 2,166,046

STEREOSCOPIC OBSERVATION INSTRUMENT, SUCH AS STEREOSCOPIC RANGEFINDERS

James Weir French, Anniesland, Glasgow, Scotland, assignor to Barr and Stroud, Limited, Glasgow, Scotland Application July 3, 1937, Serial No. 151,937
In Great Britain July 9, 1936

2 Claims. (Cl. 88—2.6)

This invention relates to stereoscopic observation instruments such as rangefinders and it has reference to all classes of instruments of this type, whether ortho-stereoscopic, pseudo-stereoscopic, or ortho-pseudo-stereoscopic.

The operation of such instruments is based on two images of an object being formed optically within the instrument and being fused stereoscopically by the observer into a single image which is compared with a reference image obtained by stereoscopic fusion of two reference images which are generally images of marks in the instrument but sometimes a second pair of images of the object under observation. For stereoscopic fusion to be properly effected, the lines of sight from the two ends of the base of measurement as reproduced in the brain of the observer should lie in the same plane and intersect at a point corresponding with the point of observation. If, however, owing to some error, it may be in the instrument, the two lines of sight as reproduced in the brain do not lie in the same plane they would never intersect, and there would be a vertical displacement between the lines where they cross, with a corresponding vertical angular divergence, viz. the angle subtended at one end of the base by the vertical displacement line. For effecting stereoscopic fusion, the two images should be capable of being brought together in or parallel to the plane of triangulation, that is, the plane containing the base and the object, but the brain has within limits the faculty of fusing two such vertically separated images, one on each of two non-intersecting lines of sight, to form a single image, but mental strain is involved which detracts from acuracy of observation. For vertical angular divergences beyond these limits, fusion of the points is impossible and a double image is seen.

It is important, therefore, to keep such vertical angular divergence within the limits of fusion and to make it as small as possible. In practice, however, an instrument such as a rangefinder necessarily has magnification, often of large amount, this magnification being essential for accuracy in order to increase the horizontal parallax to be appreciated by the eye. As a result of the magnification, however, any angular divergence which may exist appears as of increased magnitude and the difficulty of fusion under the conditions indicated is correspondingly increased. Whereas for accuracy of observation, magnification in the horizontal direction is necessary, magnification in the vertical direction plays little or no useful part.

Angular divergences in an instrument of the kind to which this invention refers are small, but even very small divergences magnified 20 to 30 times, the order of magnification often provided for in such instruments, would result in a serious angular divergence being presented to the eyes.

According to this invention there is provided an instrument comprising an image-forming optical system having in the plane of triangulation (hereinafter assumed to be horizontal) a magnification of the order usually provided for in such instruments while in the vertical direction the magnification is reduced to as small a magnitude as will enable the object to be properly observed, for the purpose of facilitating the fusion of images the vertical adjustment of which may be defective, and the optical system has optical members which, in consequence of the reduction in vertical magnification, are reduced in height, as compared with corresponding optical members where horizontal and vertical magnification are equal.

A vertical magnification in the neighborhood of unity will commonly be found to satisfy the conditions referred to, for example, unity itself, in which case there is no enlargement, or a magnification a little greater than, or a little less than, unity, there being in the last case minification instead of magnification.

Ordinarily eyepieces and objectives are circular, and prisms have square entrance and emergence faces. In accordance with the invention, objectives and eyepieces may be approximately rectangular, an upper and lower segment being absent, and the prisms may be of reduced height giving faces which are rectangular. The prisms thus become comparatively small which is of great advantage from the point of view of absence of distortion owing to the more equal distribution of temperature throughout the glass and, further, because the selection of suitable pieces of glass is easier.

It may be explained that the idea of reducing magnification in the vertical direction as compared with the magnification in horizontal direction in rangefinders is already known, it having been proposed to reduce the vertical magnification to about a half of the horizontal magnification for the purpose of obtaining greater illumination in certain types of instruments by modifying the shape of the beams of light, and having also been proposed as a means of avoiding limitation of the objective field of view in the vertical direction. The question, however, of the disadvantage arising from the magnification of angular divergences occurring in the stereoscopic observation instrument has, as far as is known, never been practically considered, nor has it ever been proposed to reduce the vertical magnification to the degree contemplated in the present invention, viz. to a magnitude in the neighborhood of unity.

The invention will now be described with reference to the accompanying drawings, in which:

Figures 1, 2 and 3 are explanatory diagrams to illustrate the problem with which the invention deals.

Figures 4 and 5 show diagrammatically in horizontal and vertical section, respectively, an elementary telescope in accordance with the invention, the optical system shown comprising only an objective and an eyepiece.

Figures 6 and 7 show a second example of telescope comprising a field lens in addition to an objective and an eyepiece.

Figures 14 and 15 are a horizontal section and a vertical section respectively showing one limb of a rangefinder in accordance with the invention.

Figure 16 is a side elevation and Figure 17 is an axial view of a reflecting prism and eyepiece lens as ordinarily designed for a rangefinder such as shown in Figures 14 and 15.

Figure 18 is a side elevation and Figure 19 is an axial view of a reflecting prism and eyepiece lens in accordance with the present invention.

Figure 20 shows the exit pupil corresponding with Figures 18 and 19.

Figure 8:
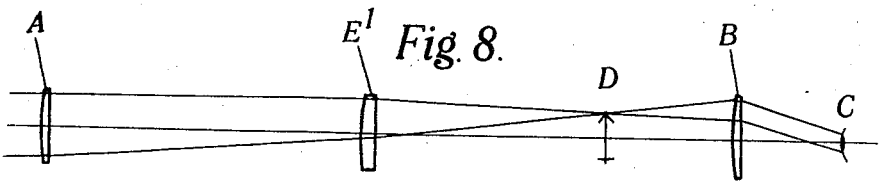
Figures 8 and 9 show a third example of telescope which is a modification of that shown in Figures 6 and 7.

In Figures 1, 2 and 3, the line $ab$ corresponds with the base of measurement and $ad$ and $bc$ represent lines of sight, all as reproduced in the brain of the observer. These lines $ad$ and $b$ intersect at $e$ if they are in the same plane, and $e$ is a point corresponding with the point of observation. If, however, owing to some defect in the instrument, the two lines $ad$ and $bc$ do not lie in the same plane, see Figure 2, they would never intersect. There would then be between them a vertical displacement from $e$ to $f$ and an angular divergence, viz. the angle $\beta$. Up to a certain value of the angle $\beta$, the brain can combine vertically separated points such as $e$ and $f$ to form a single image. Beyond that limit a double image is seen. Figure 3 shows the occurrence of vertical divergence when two pairs of images $ef$ and $e^1 f^1$ are in the field of view or in the brain as, for example, in the case of an ordinary stereoscopic rangefinder in which the image observed is compared with a reference image in the field of view. As a result of magnification in the vertical direction, the angular divergence as presented to the observer is increased and consequently the difficulty of fusion is increased.

Referring now to Figures 4 to 13, in all five examples shown, A denotes an objective, B an eyepiece, and C is the position of the observer's eye, the axis of the system being assumed to be a straight line. Light entering through the objective A is brought to a focus in the horizontal direction at the plane D and in the vertical direction at the plane $D^1$, the focal planes D and $D^1$ coinciding with the focal planes in the horizontal and vertical directions, respectively, of the eyepiece B. Figures 4 to 13 are not intended to be drawn to scale.

In the example shown in Figures 4 and 5, there is no optical member between the objective A and eyepiece B, the converging power of the objective A in the horizontal direction being relatively small as compared with its converging power in the vertical direction to form images at D and $D^1$, respectively, and the converging power of the eyepiece B in the horizontal direction being relatively strong as compared with its converging power in the vertical direction. The path of the principal ray of the oblique beam is distant from the axis near the objective and close to it near the eyepiece. The magnification in the horizontal direction is the ratio AD:DB and is intended to be of the order usually provided for in rangefinders, while the magnification in the vertical direction is $AD^1:D^1B$ and is intended to represent approximately unity.

In the example shown in Figures 6 and 7, the objective A and eyepiece B have again different converging power in the horizontal and vertical directions and a field lens E is interposed between them, the field lens E having converging power in the vertical direction only. The principal ray of the oblique beam may in the vertical direction be caused to pass through any desired part of the objective A by a suitable choice of the converging power of the field lens E, the magnification horizontally and vertically being as in the example shown in Figures 4 and 5.

Figure 9:
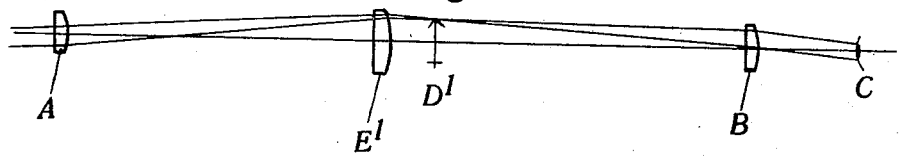

Figures 8 and 9 show a system including a field lens $E^1$ which has converging power both in the vertical and in the horizontal direction. In this case, the principal ray of the oblique beam may be arranged to pass through any desired part of the objective A both vertically and horizontally. The magnification horizontally and vertically is as in the previous example.

Figure 10:
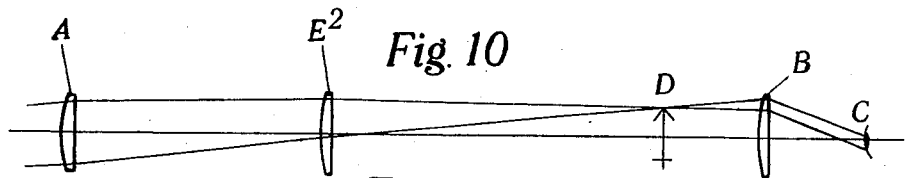
Figures 10 and 11 show a fourth example which is also a modification of the telescope shown in Figures 6 and 7.
Figure 11:
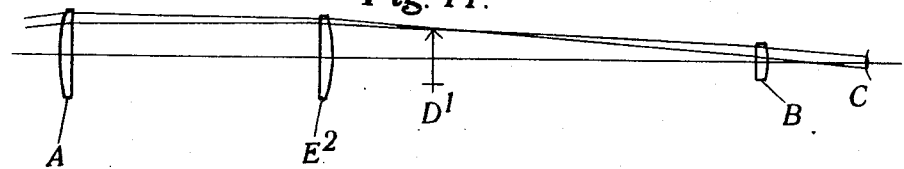

Figures 10 and 11 show a system in which the objective A has equal converging powers in the vertical and horizontal directions, the field lens $E^2$ and eyepiece B both having unequal converging powers in the vertical and horizontal directions. This arrangement enables an objective of spherical lens character to be used.

Figure 12:
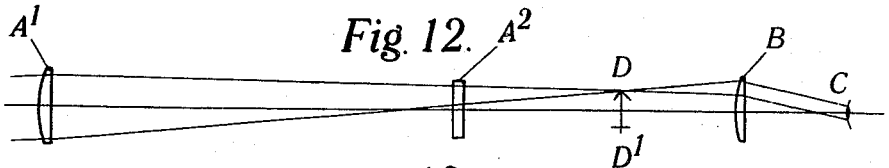
Figures 12 and 13 show a fifth example in which the telescope comprises an objective having separated components.
Figure 13:
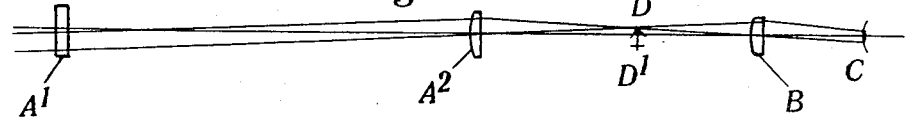

Figures 12 and 13 show a system in which the objective comprises two parts $A^1$ and $A^2$ widely separated from each other and each having different converging powers in the horizontal and vertical directions, while the eyepiece B may have equal or unequal converging powers in these two directions, depending upon whether the focal plane $D^1$ is made to coincide with the focal plane D. Where, as in Figures 12 and 13, the planes D and $D^1$ coincide, the eyepiece has equal converging powers and the eyepiece can be a lens or lenses having spherical curves; focussing movements of the eyepiece to suit different observers may as a result conveniently be provided for. The part $A^2$ of the objective is shown without curvature in the horizontal direction, but it will be understood that it may have curvature in this direction.

In all these examples, an optical part (or parts) of reduced height has been shown, viz. in Figures 4 and 5 the lens B, in Figures 6 and 7 the lenses A and B, in Figures 8 and 9 the lenses A, $E^1$ and B, in Figures 10 and 11 the lens B and in Figures 12 and 13 the lenses $A^1$, $A^2$ and B.

In the diagrams, Figures 4 to 13, the optical system has been considered as if its axis were a straight line. In practice, the system might be as shown in Figures 14 and 15 which illustrate the left hand limb of a rangefinder, the light entering the instrument at the left hand end of the base being reflected towards the middle of the base by a pentagonal prism F and there being reflected at right angles to the base towards the eye of the observer by an eyepiece prism H, the optical system comprising an objective A, eyepiece B, and, it may be, a field lens E. In all the examples, Figures 4 to 13, the height of the beam at or near the eyepiece is relatively small so that the eyepiece B and eyepiece prism H can be made small in height. By suitable choice of converging power of the component parts, the objective A, see Figures 6 and 7, and 8 and 9, and also the pentagonal prism F may be made relatively small in height. Figures 16, 17, 18 and 19 show the effect of reduction in height in a lens and prism. Ordinarily, the lens, say the eyepiece B, is circular and the prism, say the prism H, has square entrance and emergence faces, 2, 3, see Figures 16 and 17, which are views looking in the horizontal plane at the entrance face and at the emergence face of the prism, respectively. In accordance with the invention, the lens B may be made approximately rectangular, see Figures 18 and 19, which are views corresponding with Figures 16 and 17, and the height of the prism H reduced so that its entrance and emergence faces are rectangular. The exit pupil K, see Figure 20, is then approximately square.

It will be understood that while the objectives, eyepieces and field lenses have been shown as single lenses, in practice they would each usually be composed of a number of parts cemented together.

I claim:

1. A stereoscopic observation instrument with a double telescope system, the telescope systems comprising image-forming lens arrangements having in the vertical direction magnification which is reduced as compared with the magnification in the horizontal direction and including lenses and reflecting prisms which, as permitted by the reduction in vertical magnification, are reduced in height as compared with corresponding optical elements where horizontal and vertical magnification are equal, the entrance and emergence faces of the prisms being broader than high and upper and lower segments of lenses being absent.

2. A stereoscopic observation instrument with a double telescope system, the telescope systems comprising image-forming lens arrangements having in the vertical direction magnification which is reduced as compared with magnification in the horizontal direction and including in addition to the lenses, end reflecting prisms and central reflecting prisms, entrance and emergence faces of the prisms being broader than high and upper and lower segments of lenses being absent.

JAMES WEIR FRENCH.